Sept. 7, 1943. A. L. BOLLIGER 2,328,777
TRACTION DEVICE
Filed Aug. 25, 1942
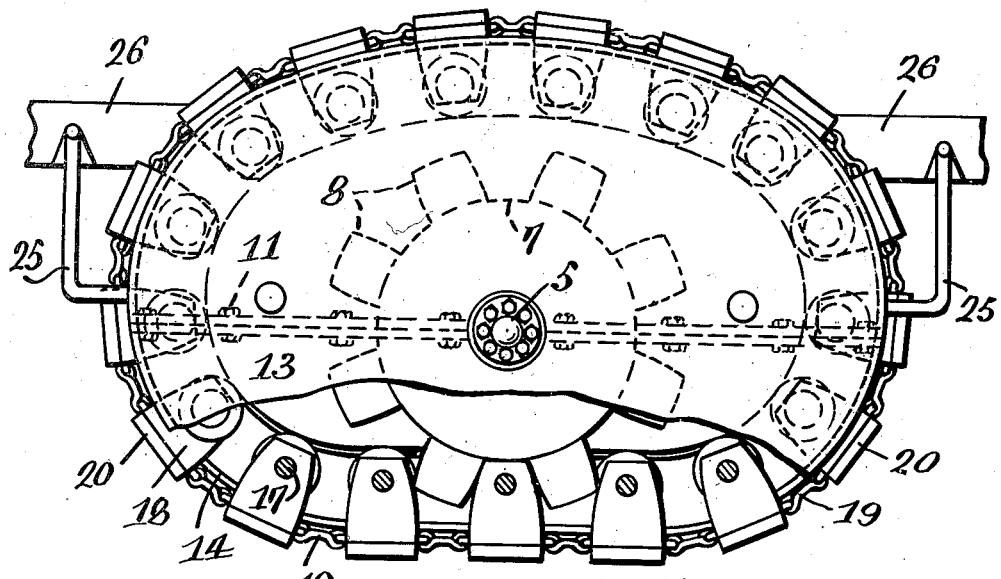
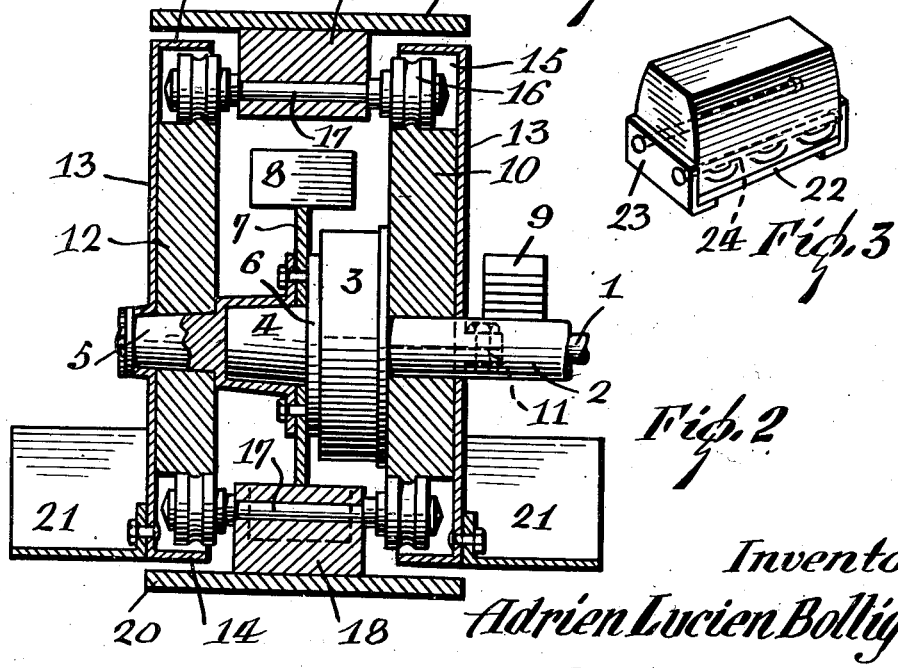
Inventor:
Adrien Lucien Bolliger
By Albt Maurois
Attorney Patented Sept. 7, 1943

2,328,777

UNITED STATES PATENT OFFICE 2,328,777

TRACTION DEVICE

Adrien Lucien Bolliger, Montreal, Quebec, Canada

Application August 25, 1942, Serial No. 456,054

2 Claims. (Cl. 305—4)

The present invention pertains to a novel traction device adapted especially for military use, although capable of other general uses as well.

The principal object of the invention is to provide a traction device of the endless belts type, which is self-contained for protection from gun fire and also to contain the lubricant. The device is adapted to travel over ice, snow, sand, mud and other difficult surfaces.

Accordingly, the device includes a pair of opposed oval plates having rollers riding on their respective peripheries. Opposed rollers are grouped in pairs by a series of shafts. On the shafts, in turn, are mounted traction blocks hinged to intervening members to form an endless chain. The driving axle carries a pinion with teeth adapted to enter the spaces between the blocks.

To complete the protection of the apparatus from gun fire, for military use, outer plates are fixed to the outer surfaces of the oval plates. The outer plates are flanged inward over the peripheries of the oval plates to form channels for the rollers in addition to protecting them.

Another feature of the invention resides in mounting runners on the lower edges of the outer plates to facilitate travelling on ice, snow and mud.

The invention is fully disclosed by way of example in the following description and in the accompanying drawing in which:

Figure 1 is a side elevation of the device, partly broken away;

Figure 2 is a vertical transverse section, and

Figure 3 is a perspective view of a modification.

Reference to these views will now be made by use of like characters which are employed to designate corresponding parts throughout.

Figures 1 and 2 illustrate the invention applied to a truck or other suitable vehicle having a conventional axle 1. The axle is contained in a sleeve 2 on which is mounted a brake drum 3. On the usual tapered hub 4 is fitted an auxiliary hub 5. To the brake disk 6 is secured a toothed wheel or pinion 7 having widened teeth 8.

Between the brake 3 and leaf spring 9, an oval plate 10 is fitted on the sleeve 2. The plate is made in two parts for the purpose of assembly, and the parts are held together by bolts 11. On the auxiliary hub 5 is mounted a similar oval plate 12 of the same shape and in the same position as plate 10.

An outer plate 13 is mounted on the outer surface of each plate 10, 12 and has an inwardly directed flange 14 spaced from the periphery of the corresponding oval plate to form a channel 15.

The channels receive a plurality of rollers 16 joined in pairs by shafts 17. On each such shaft is mounted a block 18 for a purpose that will presently appear. The blocks are joined in a permanent spaced relation by being hinged to intervening plates or links 19, thereby forming an endless chain. The spacing is such that the teeth 8 are adapted to enter therein to propel the chain when power is applied to the axle 1.

Sole plates 20 of greater width than the blocks 18 may be applied to the latter for increased traction. Also, extension runners 21 may be fastened to the lower edges of the outer plates 13 for travelling on snow or soft ground.

Sole plates of the same width as the blocks are shown in the modified structure shown in Figure 3. Here the sole plate is designated by the numeral 22 and is held by L-plates 23 secured by tie rods 24 connecting each pair.

To prevent the oval plates 10, 12 from turning, they are engaged by forked arms 25 extending from the chassis 26 of the vehicle.

It will now be seen that the propelling mechanism is self-contained and fully enclosed on its sides by the oval plates and outer plates 13. Thus, the working parts are well armored in a manner that makes the device especially adapted for military uses. It will be understood however that other uses are contemplated.

Although specific embodiments of the invention have been illustrated and described, it will be understood that various alterations in the details of construction may be made without departing from the scope of the invention as indicated by the appended claims.

What I claim as my invention is:

1. In a traction device, an axle, a pair of oval plates mounted thereon, rollers mounted on the peripheries of said plates, shafts joining opposed rollers in pairs, traction blocks mounted on said shafts, connecting means holding said blocks spaced apart, a driving pinion mounted on said axle and having teeth adapted to enter the spaces between said blocks, outer plates secured to the outer surfaces of said oval plates and flanged inwardly over the peripheries of the latter to form channels receiving said rollers, and outwardly extending runners secured to the lower edges of said outer plates.

2. In a traction device, an axle, a pair of oval plates mounted thereon, rollers mounted on the peripheries of said plates, shafts joining opposed rollers in pairs, traction blocks mounted on said shafts, connecting means holding said blocks spaced apart, a driving pinion mounted on said axle and having teeth adapted to enter the spaces between said blocks, widened sole plates secured to said blocks, outer plates secured to the outer surfaces of said oval plates and flanged inwardly over the peripheries of the latter to form channels receiving said rollers, and outwardly extending runners secured to the lower edges of said outer plates.

ADRIEN LUCIEN BOLLIGER.